United States Patent
Lin et al.

(10) Patent No.: US 9,638,601 B2
(45) Date of Patent: May 2, 2017

(54) SYSTEMS AND METHODS FOR DETERMINING ROTARY BLADE TRACK AND BALANCE ADJUSTMENTS

(71) Applicant: Simmonds Precision Products, Inc., Vergennes, VT (US)

(72) Inventors: Yiqing Lin, Glastonbury, CT (US); Ramona A. Georgescu, Coventry, CT (US); Daniel Hiatt, South Burlington, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 206 days.

(21) Appl. No.: 14/313,719

(22) Filed: Jun. 24, 2014

(65) Prior Publication Data

US 2015/0096370 A1    Apr. 9, 2015

Related U.S. Application Data

(63) Continuation-in-part of application No. 14/168,445, filed on Jan. 30, 2014.

(Continued)

(51) Int. Cl.
*G01M 1/14*      (2006.01)
*B64C 27/00*     (2006.01)

(52) U.S. Cl.
CPC ............. *G01M 1/14* (2013.01); *B64C 27/008* (2013.01)

(58) Field of Classification Search
CPC ...... B64C 27/001; B64C 27/008; G01M 1/14; G01M 1/24; G01M 1/36
See application file for complete search history.

(56) References Cited

U.S. PATENT DOCUMENTS 5,587,930 A  *  12/1996  Hori .................. G01M 99/00
                                             702/185
6,567,757 B2     5/2003   Bechhoefer et al.
(Continued)

FOREIGN PATENT DOCUMENTS

| EP | 0089228 A2 | 9/1983 |
| EP | 1228960 A1 | 8/2002 |
| GB | 2159484 A  | 12/1985 |

OTHER PUBLICATIONS

Anonymous: "DSS MicroVib II Aircraft Analyzer page", Aug. 30, 2013 (Aug. 30, 2013), XP055172585, Retrieved from the Internet: URL:https://web.archive.org/web/20130830113516/http://dismicro.com/products/prod_mv2main.htm [retrieved on Feb. 27, 2015] *the whole document *.

(Continued)

*Primary Examiner* — Natalie Huls
(74) *Attorney, Agent, or Firm* — Locke Lord LLP; Scott D. Wofsy; Christopher J. Cillié

(57) ABSTRACT

A method of adjusting a rotary blade includes receiving performance data for a rotary blade, receiving an adjustment constraint for the rotary blade, defining an adjustment space for alternative adjustment solutions for the rotary blade including a plurality of alternative adjustment solutions, and calculating expected performance for one of the plurality of alternative adjustment solutions. Based on the expected performance of the one of the plurality of alternative adjustment solutions, the method determines whether to calculate expected performance for another of the plurality of alternative adjustment solutions.

13 Claims, 6 Drawing Sheets

Related U.S. Application Data

(60) Provisional application No. 61/888,748, filed on Oct. 9, 2013.

(56) References Cited

U.S. PATENT DOCUMENTS

| | | | |
|---|---|---|---|
| 6,574,572 | B2 | 6/2003 | Bechhoefer |
| 6,950,763 | B1 | 9/2005 | Bechhoefer |
| 7,272,513 | B2 | 9/2007 | Bechhoefer |
| 7,512,463 | B1 | 3/2009 | Bechhoefer |
| 2011/0191040 | A1* | 8/2011 | Bechhoefer .......... B64C 27/008 702/56 |

OTHER PUBLICATIONS

Ellick Wilson et al: "V-22 rotor track and balance on-board and ground station functionality and field experience", Aerospace Conference, 2011 IEEE, IEEE, Mar. 5, 2011 (Mar. 5, 2011), pp. 1-8, XP031938142, DOI: 10.1109/AERO.2011.5747558 ISBN: 978-1-4244-7350-2 *pp. 4-7; Figure 8 *.

Ventres S et al: "Rotor Tuning Using Vibration Data Only", International Annual Forum of the American Helicopter Society, XX, XX, vol. 1, May 1, 2000 (May 1, 2000), pp. 623-629, XP001011843, * pp. 626-628; figures 4-10 *.

Search Report and Opinion issued by the European Patent Office on Feb. 27, 2015 for European Patent Application 14188207.

Bechhoefer et al., *IMD HUMS Rotor Track and Balance Techniques*, Aerospace Conference 2003 Proceedings, 2003 IEEE, vol. 7, Mar. 8-15, 2003, pp. 3205-3211. ISBN 0-78037651-X/03.

Miller et al: "A comparison of main rotor smoothing adjustments using linear and neural network algorithms", Journal of Sound & Vibration, London, GB, vol. 311, No. 3-5, Nov. 5, 2007 (Nov. 5, 2007), pp. 991-1003, XP022453331, ISSN: 0022-460X, DOI: 10.1016/J.JSV.2007.09.041 *2. Technical Background *.

Hongmei Liu et al: "Helicopter Rotor Balance Admustment using GRNN Neural Network and Genetic Algorithm", Intelligent Systems, 2009. GCIS '09. WRI Global Congress on, IEEE, Piscataway, NJ, USA, May 19, 2009 (May 19, 2009), pp. 101-106, XP031516198, ISBN: 978-0-7695-3571-5 *pp. 103-104; figures 1,3 *.

Wang S et al: "A Probability-Based Approach to Helicopter Rotor Tuning", Journal of the American Helicopter Society, American Helicopter Society, Alexandria, VA, US, vol. 50, No. 1, Jan. 1, 2005 (Jan. 1, 2005), pp. 56-64, XP001222952, ISSN: 002-8711, DOI: 10.4050/1.3092843 *p. 62 *.

Jongsoo Lee et al: "Parallel genetic algorithm implementation in multidisciplinary rotor blade design", Journal of Aircraft, vol. 33, No. 5, Sep. 1, 1996 (Sep. 1, 1996), pp. 962-969, XP055172248, ISSN: 0021-8669, DOI: 10.2514/3.47042 *p. 1, col. 2 *.

Search Report and Opinion issued by the European Patent Office on Feb. 27, 2015 for European Patent Application 14188204.

Paper titled "IMD HUMS Rotor Track and Balance Techniques" written by Eric Bechhoefer and Dennis Power. pp. 1-7.

* cited by examiner

SYSTEMS AND METHODS FOR DETERMINING ROTARY BLADE TRACK AND BALANCE ADJUSTMENTS

CROSS-REFERENCE TO RELATED APPLICATIONS

This application is a continuation-in-part of U.S. patent application Ser. No. 14/168,445, filed Feb. 14, 2014, which is incorporated by reference herein in its entirety.

BACKGROUND OF THE INVENTION

1. Field of the Invention

The present disclosure relates to rotary blades, and more particularly to track and balance performance adjustments for rotary blades.

2. Description of Related Art

Aircraft manufacturers and maintainers commonly manage aircraft vibration to limit its effects on crew fatigue and expected service life of aircraft components. A significant contributor to vibration on certain types of aircraft, such as rotary wing aircraft, is rotary blade track and balance. Blade track relates to the tendency of a given blade to depart from the path or paths taken by predecessor blades in an aircraft blade set. Blade balance relates to the relative weight of each blade at the hub in relation to the others. Since track and balance performance can change due to various factors, such as manufacturing variation between blades within a blade, water absorption, or erosion during the blade service life, rotary blade track and balance is typically monitored and, if necessary, adjusted to improve aircraft vibration levels. Blades generally include one or more adjustment mechanisms that influence blade track and balance performance, such as provisioning for increasing or reducing hub weights, changing pitch rod length, and/or trim tabs for altering blade contour during rotation.

Change to one adjustment mechanism can influence other adjustment mechanisms of the blade or other blades in the blade set. For example, a hub weight change to one blade can alter the track of that blade, thereby creating the need for an offsetting trim tab adjustment. Since adjustments can be resource intensive, conventional track and balance adjustment algorithms typically model a group of alternative track and balance adjustment solutions for a given rotary blade set in order to select one most appropriate given the condition of the blade set and adjustment interactions.

One challenge to determining an appropriate track and balance adjustment solution for a rotary blade set is the size potential of the adjustment solution set. For example, in an aircraft with 16 adjustment-on/adjustment-off variables, e.g. four blades with four adjustment mechanisms per blade, there are $2^{16}$ or 65,536 alternative adjustment-on/adjustment-off variable combinations. Each combination in turn can have multiple adjustment solutions with different adjustment values. Since each alternative adjustment solution can have a different expected performance, exhaustive search of the solution space by determining expected performance for each solution is normally not done. Instead, conventional adjustment algorithms only explore a subspace of the solution space typically by not optimizing candidate adjustment solutions for higher harmonics (e.g. those with frequencies above 2 times per rotation) and/or restricting exploration of the solution space.

Such conventional methods and systems have generally been considered satisfactory for their intended purpose. However, there is a need in the art for improved systems and methods for determining track and balance adjustment solutions. The present disclosure provides a solution for these problems.

SUMMARY OF THE INVENTION

A method of determining an adjustment for a rotary blade includes receiving performance data for a rotary blade, receiving a constraint for rotary blade adjustment, defining an adjustment space including adjustment solutions for the rotary blade having at least first and second alternative rotary blade adjustment solutions, and calculating expected performance for the first alternative rotary blade adjustment solution. Based on the calculated expected performance for the first rotary blade adjustment solution, the method determines whether to calculate an expected performance for the second alternative rotary blade adjustment solution.

In accordance with certain embodiments the method can include receiving input with a user-defined or predetermined performance threshold. The calculated expected performance of the rotary blade first adjustment can be compared to the threshold, and performance of the second adjustment can be calculated if expected performance of the first adjustment is within the threshold. The method can include determining not to calculate expected performance of the rotary blade second adjustment if the expected performance of the rotary blade first adjustment is outside the user-defined threshold or predetermined threshold input.

In accordance with certain embodiments the method can include defining an adjustment solution search tree. The search tree can include a root level, a leaf level, and intervening levels having one or more nodes defining adjustment alternatives. The node adjustment alternatives can be binary adjustment-on and adjustment-off indicators indicative of whether a given adjustment includes a change to a given adjustment mechanism. The indicator can be a binary integer, such as zero or one for example. The search tree can have branches linking one node on each level of the search tree. Branches of the search tree can interconnect a set of adjustment nodes such that each branch defines a potential adjustment solution.

It is also contemplated that in accordance with certain embodiments determining the expected performance of the rotary blade for a potential adjustment solution can include computing an adjustment value for a solution including an adjustment-on node. The method can include determining if the computed adjustment value is feasible, such as by comparing the computed adjustment to a received constraint or limitation of the rotary blade adjustment mechanism. The method can also include pruning the node and other nodes branched below the node if the computed adjustment value is not feasible or if the expected performance is outside of a predetermined vibration and/or track performance limit for the rotary blade. If the calculated performance of a solution is within the predetermined vibration and/or track performance limit, the limit can be replaced with the calculated performance for purposes of determining whether another solution is within the predetermined limit.

A system for determining an adjustment of the track and balance of a rotary blade includes a processor in communication with memory. The memory has instructions recorded on it that, when read by the processor, cause the processor to receive performance data for a rotary blade, receive at least one adjustment constraint for the rotary blade, define an adjustment space including at least a first and a second adjustment, calculate an expected performance of the rotary blade first adjustment using the performance data, and determine whether to calculate expected performance of the rotary blade second adjustment using the expected performance for the first adjustment.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 2:
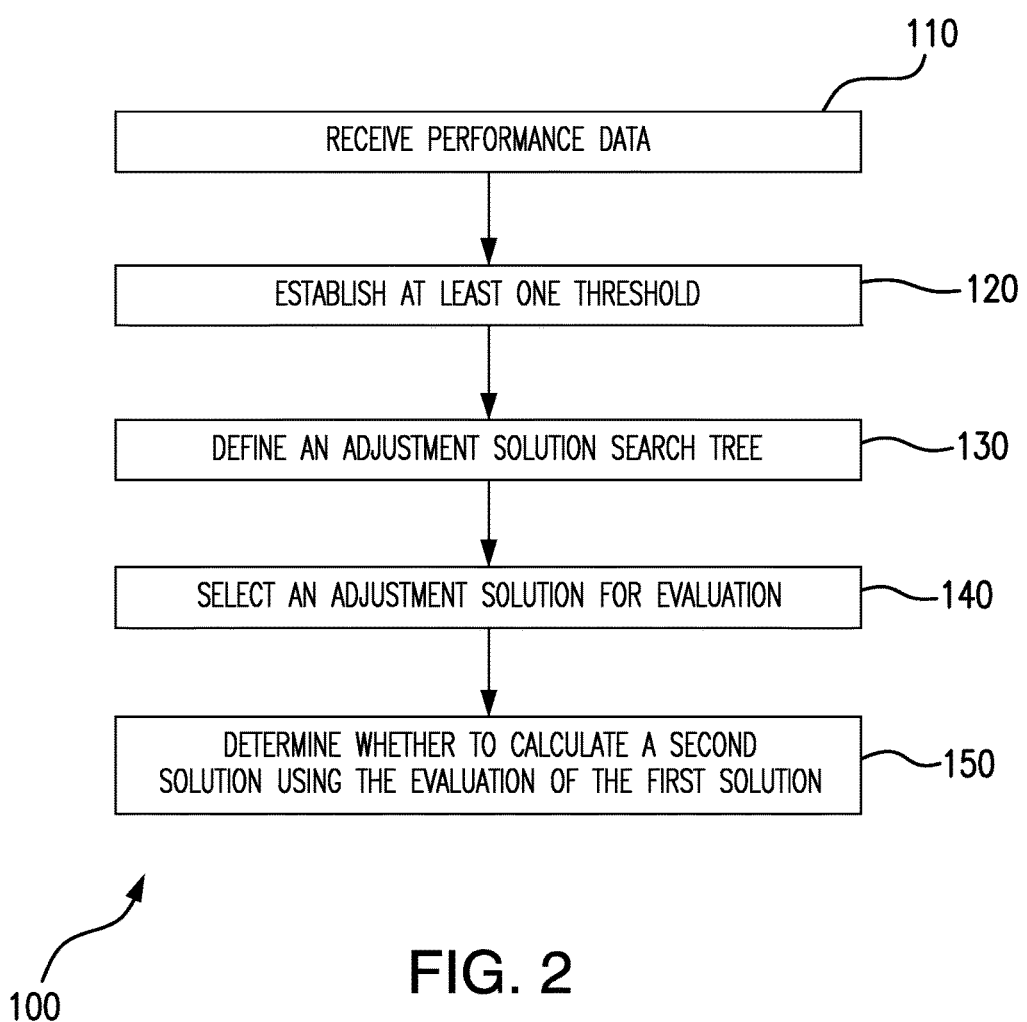
FIG. 2 is a flow diagram for a method determining an adjustment solution for the blades of FIG. 1, showing steps of the method.

Reference will now be made to the drawings wherein like reference numerals identify similar structural features or aspects of the subject disclosure. For purposes of explanation and illustration, and not limitation, a method for determining a track and balance adjustment strategy in accordance with the disclosure is shown in FIG. 2 and is designated generally by reference character 100. Other embodiments of systems and methods for determining track and balance adjustment strategies in accordance with the disclosure, or aspects thereof, are provided in FIGS. 2-6, as will be described. The systems and methods described herein can be used for determining track and balance adjustment strategies for rotary wing aircraft such as helicopter main rotor and tail rotor blades.

Figure 1:
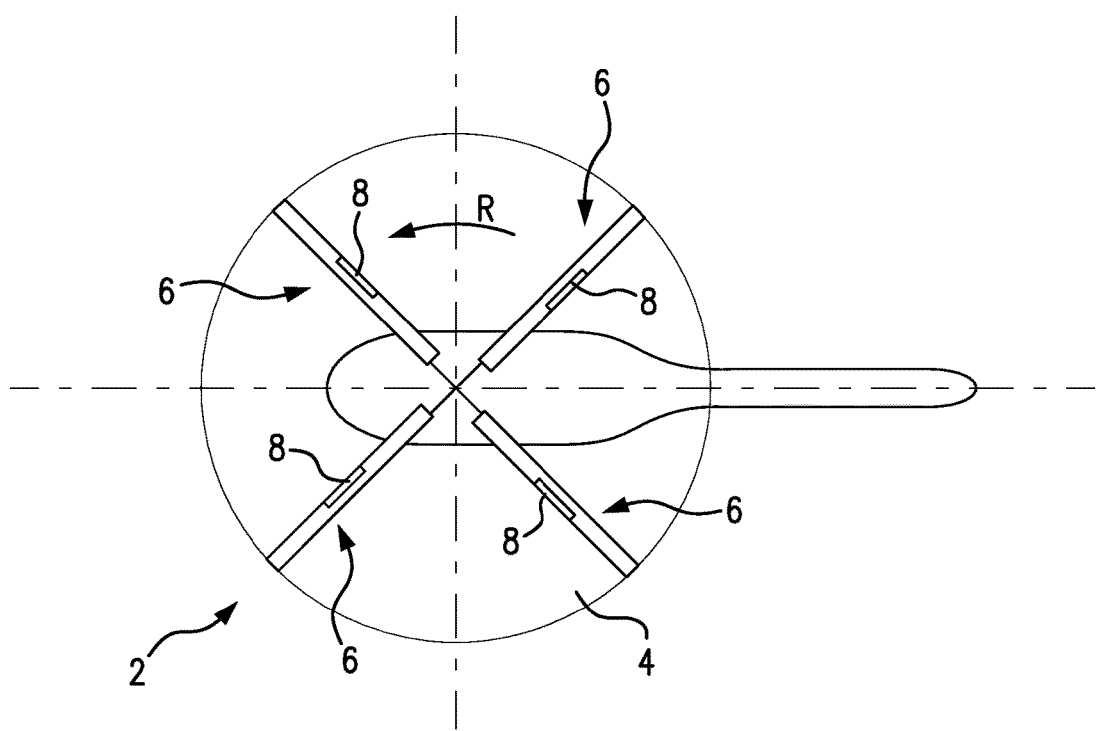
FIG. 1 is a schematic plan view of a rotary wing aircraft, showing aircraft rotary blades with adjustment mechanisms.

Referring to FIG. 1, a rotary wing aircraft 2 is shown. Rotary wing aircraft 2 includes a rotor disk 4 with a plurality of rotary blades 6. Rotary blades 6 rotate about rotor disk 4 in in direction R and have blade-specific tracks and balances. Rotary blades 6 also each include at least one track and balance adjustment mechanism 8 that can be a hub weight, trim tab, pitch rod, or similar device. Adjustment mechanism 8 influences track and balance performance of an individual blade, a subset of blades, or the complete set of blades forming rotor disk 4 by inducing vibration into rotary wing aircraft 2 during operation. As will be appreciated by those skilled in the art, it is desirable to maintain vibration resulting from track and balance of rotary blades within a predetermined threshold.

With reference to FIG. 2, a method 100 of determining an adjustment for the track and balance of a rotary blade, e.g. rotary blades 6 (shown in FIG. 1), is shown. Method 100 includes a step 110 for receiving performance data for the rotary blade. The performance data can be vibration data and/or blade track data. The performance data can also relate to a single blade of a blade disk, e.g. rotor disk 4 (shown in FIG. 1), a subset of the blades, or all the blades of the blade disk.

Method 100 also includes a step 120 for establishing at least one threshold. The threshold can include a number of possible adjustments for the rotary blade for a potential adjustment of the rotary blade. The threshold can also include a performance level of the rotary blade for a potential adjustment of the rotary blade, such as track spread or vibration level. It is contemplated that the thresholds can be associated with specific flight regimes, sensors, sensor harmonic, and sensor weighting. Adjustment constraints can include upper and/or lower bounds for a specific adjustment, adjustment types, or adjustment location. In embodiments, the thresholds can be updatable. In certain embodiments, a threshold can be a constraint that remains fixed.

In certain embodiments, a user input can be received including user-defined mode selection indicative of whether the solution is a 'best ride', i.e. optimized given the present condition of the blade set, or a 'meets limits' solution where the adjustment solution drives vibration below a predetermined threshold. For 'best ride' mode, method 100 further includes receiving a user-defined threshold that an adjustment solution must satisfy in order to be acceptable. For 'meets limits' mode, method 100 further includes receiving a threshold for an individual or set of flight regimes, sensors, and harmonic. For example, defining a vibration threshold as 5% above minimum vibration can be utilized so that the algorithm includes a greater number of adjustment solutions than when the limit is used. This can provide a 'good enough' adjustment solution that reduces the number of adjustment mechanisms disturbed by a track and balance event on an aircraft by selecting adjustment solutions within a predetermined percentage performance of optimized performance. In situations where progressively complex adjustment solutions accompany diminishing performance improvement, this can simplify the adjustment process.

With continued reference to FIG. 2, method 100 further includes a step 130 for defining an adjustment solution search tree. In embodiments, this can include one or more steps for defining an adjustment search tree 10 (shown in FIG. 3) for use with a branch and bound solution search algorithm (described below). Method 100 additionally includes a step 140 for selecting an adjustment solution from the search tree for evaluation and a step 150 for determining whether to calculate a second solution using the evaluation of the first adjustment solution. Since comprehensively determining all combinations of possible adjustment solutions can be prohibitively time consuming, this can allow for evaluating only a portion of the solution space and finding an optimal adjustment solution.

Figure 3:
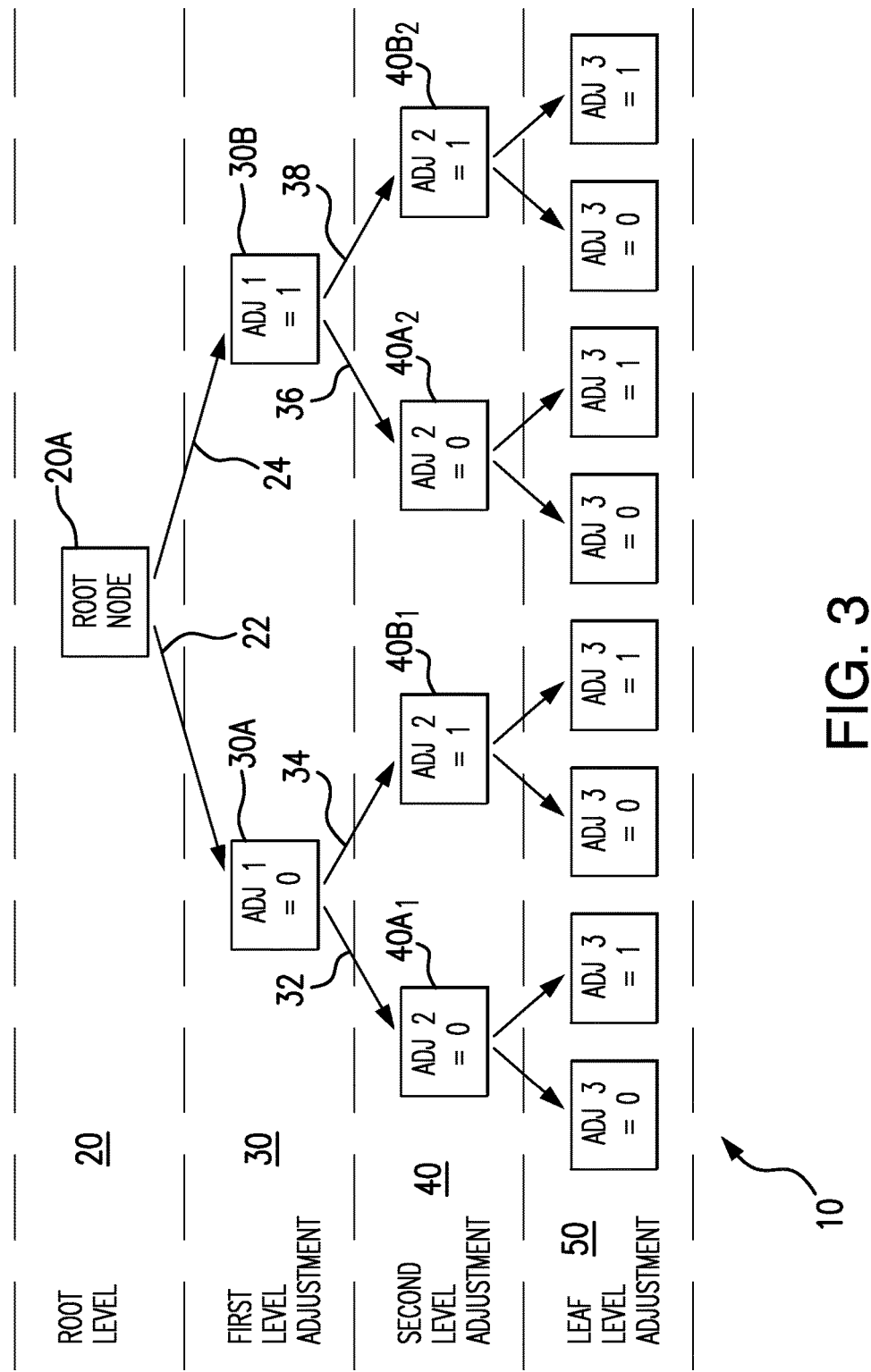
FIG. 3 is diagram of a search tree of adjustment solutions for a rotary blade of the aircraft of FIG. 1, showing a multilevel search tree defining the search tree.

With reference to FIG. 3, search tree 10 is shown. Search tree 10 includes a root level 20, a first adjustment level 30, a second adjustment level 40, and a leaf level 50. Search tree 10 is a multilevel search tree with a plurality of intervening adjustments levels, e.g. first adjustment level 30 and second adjustment level 40, disposed between root level 20 and leaf level 50. It is to be understood and appreciated that the search tree illustrated in FIG. 3 is a simplified search tree illustrating a rotary blade (or blade set) with three adjustments and eight possible adjustment combinations. Rotary blades and blades sets with greater numbers of adjustments have larger solution spaces insofar as the number of possible solutions increases exponentially with increase in the number of adjustment variables.

Root level 20 has a root node 20A. First adjustment level 30 enumerates a first variable associated with a first adjustment mechanism, e.g. adjustment mechanism 8 (shown in FIG. 1) for one of rotary blades 6 (shown in FIG. 1). The first variable is a binary integer variable having a value of 1 or 0, each possible value of the variable being included in respective adjustment-on node 30A and adjustment-off node 30B. Adjustment-on node 30A is branched from root node 20A by a branch 22 and adjustment-off node is branched from root node 20A by a branch 24. In this respect, adjustment solutions branched to root node 20A through adjustment-on node 30A when solved include calculated adjustments to the first adjustment mechanism. Adjustment solutions branched to root node 20A through adjustment-off node 30B leave the first adjustment mechanism unchanged from its existing condition and/or position.

Second adjustment level 40 enumerates a second variable associated with a second adjustment mechanism different than that of the first adjustment mechanism, e.g. adjustment mechanism 8 (shown in FIG. 1) for another of rotary blades 6 (shown in FIG. 1). The second variable is also a binary integer variable having a value of 1 or 0, each possible value of the variable being included in respective adjustment-on node 40A and adjustment-off node 40B. Separate adjustment-on nodes $40A_1$ and $40A_2$ are each branched from nodes of first adjustment level 30 and separate adjustment-off nodes $40B_1$ and $40B_2$ by a branch 32, a branch 34, a branch 36, and a branch 38. In this respect nodes of second adjustment level 40 branched through nodes of first adjustment level 30 to root node 20A define all possible combinations of a search space having the first and second variables.

Leaf level 50 is similar to second adjustment level 40 with the difference that it introduces a final adjustment variable of the solution space and includes a greater number of nodes and branches. In this respect, each potential combination of adjustment is listed at the leaf level. In embodiments, additional intervening adjustment levels with adjustment variables are present between the second adjustment level 40 and leaf level 50. Such embodiments have greater numbers of potential adjustment combinations that correspond to the number of adjustment levels (and enumerated adjustments).

Branch and bound techniques are general algorithms for finding optimal solutions of various optimization problems, especially in discrete and combinatorial optimization. Starting by considering the root problem (the original problem with a solution space comprised of the complete feasible region), the lower-bounding and upper-bounding procedures are applied to the root problem. If the bounds match, then an optimal solution has been found and exploration of the solution space terminates. Otherwise, the solution space is divided into two or more regions defined by sub-problems that further partition the feasible space. The algorithm is applied recursively to the sub-problems. If the optimal solution is found to a sub-problem, it is a feasible solution to the full problem, but may not necessarily be the globally optimal solution to the problem. If the lower bound for a node exceeds the best known feasible solution, no globally optimal solution exists in the subspace of the feasible region represented by the node. Therefore, the node can be removed from consideration. The search proceeds until all nodes have been solved or pruned, or until some specified threshold is met between the best solution found and the lower bounds on all unsolved problems.

With respect to reducing the computational requirements of exploring a solution space as illustrated in an exemplary fashion in FIG. 3, branch and bound algorithms can provide a computationally efficient approach where only a small portion of the tree nodes are evaluated yet guarantee that a solution found is optimal. This is because at each level, when a new variable is branched, an additional constraint is added to specify the value of the variable, i.e. 0 or 1. A child node is therefore more constrained than its respective parent node. This means, if a parent node is not feasible, then any of its child nodes are also not feasible (such as by adding additional constraints). In the context of selecting track and balance adjustments for calculation, this means that if a parent node does not have acceptable track and balance performance, then its child nodes cannot have improved track and balance performance (through adding additional constraints). Therefore, when a parent node does not have acceptable performance, performance calculations for its children nodes need not be done, and the branch of the search tree including the node can be pruned. This allows for reducing the number of performance calculations required to explore the solution space, potentially dramatically reducing the computational effort required to arrive at an optimal solution. In certain embodiments, a search tree having 16 adjustment variables and 65,536 potential adjustment combinations can be pruned such that less than 1% of combinations are evaluated.

Figure 4:
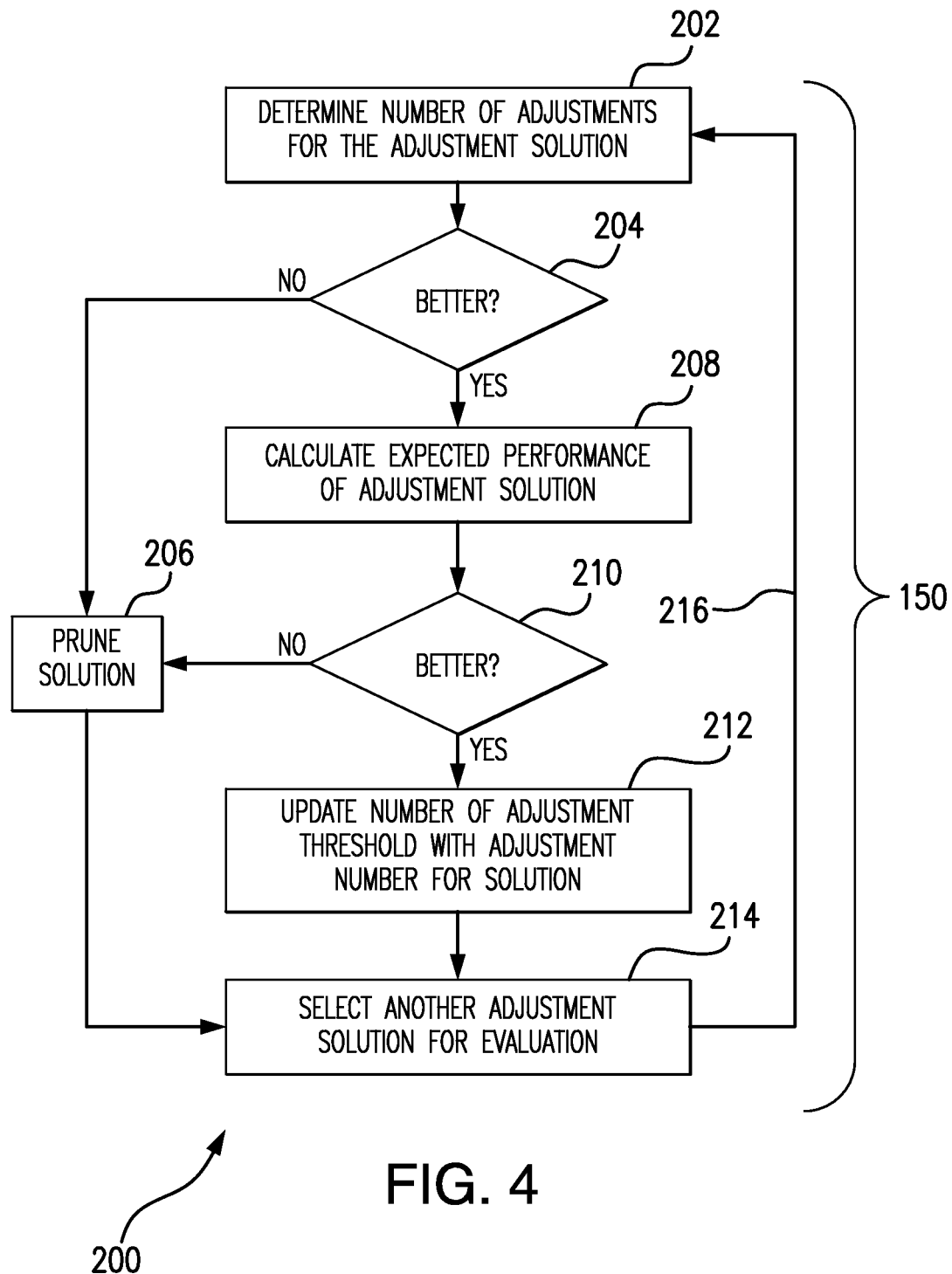
FIG. 4 is flow diagram for another embodiment of the method of FIG. 2, showing a 'meet limits' mode of determining an adjustment solution.

With reference to FIG. 4, a method 200 for determining an adjustment for a rotary blade is shown. Method 200 is similar to method 100 additionally includes receiving a 'meets limits' mode selection input, determining a current minimum number of adjustments (i.e. an adjustment threshold), and receiving a performance constraint. 'Meets limits' entails determining an adjustment solution or plurality of adjustment solutions that provide 'good enough' expected performance in relation to the received performance constraint, e.g. below a given flight regime, sensor, or harmonic threshold. The adjustment threshold is an integer value that describes the number of possible adjustments to the blade or blade set. Initially, the adjustment threshold can be the total number of possible adjustments for the rotary blade or blade. The performance constraint is objective assessments of blade performance, and can include, for example, a peak vibration level or blade spread distance for example.

Method 200 includes a step 202 for determining the minimum required number of adjustments associated with the selected adjustment solution. The determined number of adjustments is then compared to the adjustment threshold in a step 204. In the event that the determined number of adjustments is greater than the current minimum number of adjustments, then the selected adjustment solution is pruned in a step 206. Pruning includes eliminating from further consideration adjustment solutions branched from the selected adjustment solution in the search tree. For example, with reference to FIG. 3, if it is determined that adjustment-on node 30A is to be pruned, adjustment-on node $40A_1$ and adjustment-off node $40B_1$ are also be pruned. This eliminates potential adjustment solutions without calculating expected performance on the basis of feasibility, making the search process faster. Subsequent to pruning in step 206, a subsequent adjustment solution is selected for evaluation in a step 214 and the steps (indicated with a reference numeral 150 in FIG. 4) are repeated.

In the event that the determined number of adjustments is smaller than the adjustment threshold, expected performance for the selected adjustment solution is calculated in a step 208. The calculated expected performance is compared to the performance threshold in a step 210, and in the event that the comparison indicates that the expected performance for the selected adjustment solution is worse than the performance threshold, then the selected adjustment solution and those branched from it are pruned in step 206.

In the event that comparison indicates that the expected performance is better than the performance threshold and the number of adjustments is lower than the adjustment threshold, then the adjustment threshold is updated. This further expedites the search as subsequent nodes selected for evaluation are compared against the updated adjustment threshold which has a smaller number of adjustments, making it more likely that nodes will be pruned prior to having their expected performance determined.

Another adjustment solution is then selected for evaluation in a step 214, and steps 202-214 (indicated with a reference numeral 150 in FIG. 4) are repeated. It is contemplated that steps 202-210 are iteratively repeated until all potential adjustment solutions defined within the search are either pruned or identified as acceptable adjustment solution alternatives.

Figure 5:
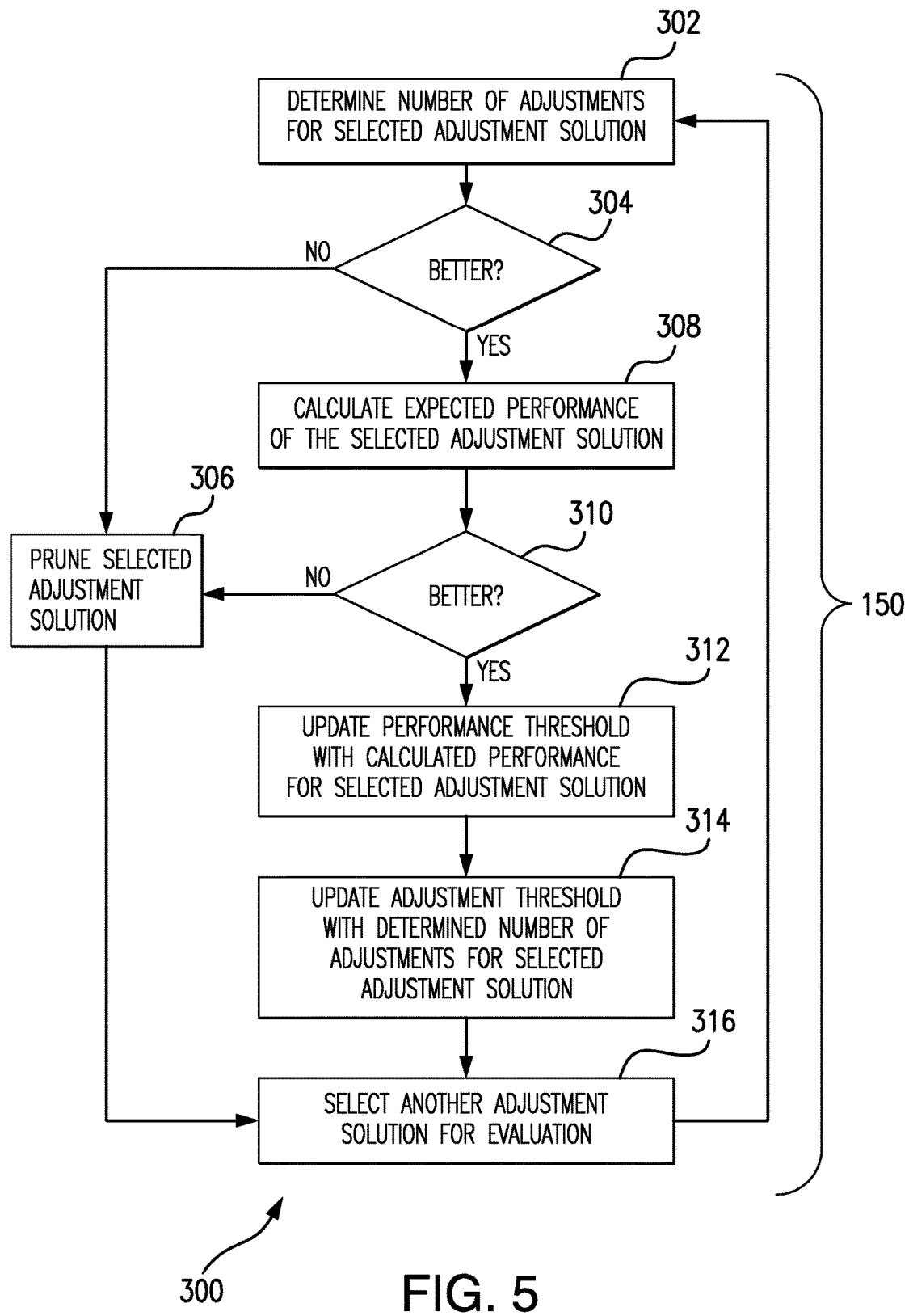
FIG. 5 is flow diagram for yet another embodiment of the method of FIG. 2, showing a 'best ride' mode of determining an adjustment solution.

With reference to FIG. 5, a method 300 for determining an adjustment for a rotary blade is shown. Method 300 is similar to method 100 additionally includes receiving a 'best ride' mode selection input, determining a current minimum number of adjustments threshold (i.e. an adjustment threshold), and determining a current performance threshold (i.e. a performance threshold). 'Best ride' refers to an adjustment solution that provides the best expected performance once each potential adjustment solution has either been pruned or had an expected performance calculated.

Method 300 includes a step 302 for determining the minimum required number of adjustments associated with the selected adjustment solution. The determined number of adjustments is then compared with the adjustment threshold in a step 304. In the event that the determined number of adjustments is greater than the current adjustment threshold, then the selected adjustment solution is pruned in a step 306. Should the determined number of adjustments be equal to or smaller than the adjustment threshold, expected performance for the selected adjustment solution is calculated in a step 308 and compared to the performance threshold in a step 310. It is to be understood that, in embodiments, the comparison is to the performance threshold plus a predetermined performance margin, i.e. 1+x %. This can provide a good enough solution when searching for an optimal solution in 'best ride' mode with fewer adjustments.

In the event that the comparison indicates that the expected performance for the selected adjustment solution is worse than the performance threshold, then the selected adjustment solution and those branched from it are pruned in step 306. Should the comparison indicated that the expected performance is better than the performance threshold, then the performance threshold is updated in a step 312 using the calculated expected performance from step 308. The adjustment threshold is also updated if the calculated solution has fewer adjustments than the current adjustment threshold. Another adjustment solution is then selected for evaluation in a step 316, and steps 302-316 (indicated with a reference numeral 150 in FIG. 5) are repeated. It is contemplated that steps 302-316 are iteratively repeated until all the potential adjustment solutions defined within the search are either pruned or an optimal adjustment solution is identified. It is to be understood that at each tree node where an adjustment solution is calculated using quadratic programming (in 'best ride' mode) or second order cone programming ('meets limits' mode).

In embodiments, more than one threshold can be used to prune the search tree. For example, a first threshold can be the vibration level and a second threshold can be the number of adjustments. This allows for pruning the search tree more aggressively than using a single threshold, thereby speeding up algorithm executing, while still ensuring that the solution found in optimal.

In certain embodiments, heuristics can be used at a search tree node to speed up the branch and bound algorithm. For example, in meet limits mode, the algorithm can maintain a feasible solution database listing all feasible adjustments that have vibration levels below the threshold. At each search tree node, prior to solving the second-order cone-programming problem, the database is first checked for listed solutions that satisfy the node's adjustment enabled/disabled requirements. In the event that there is such a solution listed, then the node is not solved and the algorithm moves to the next node. Alternatively, in best ride mode, solve the constrained optimization problem, round the solution to see if the rounded adjustment is still feasible and has a smaller number of adjustments. In the event that it is feasible and has a smaller number of adjustments, update the adjustment threshold with smaller number of adjustments. This speeds up the algorithm by reducing the number of adjustments threshold and reducing the size of the search tree and solution space.

Figure 6:
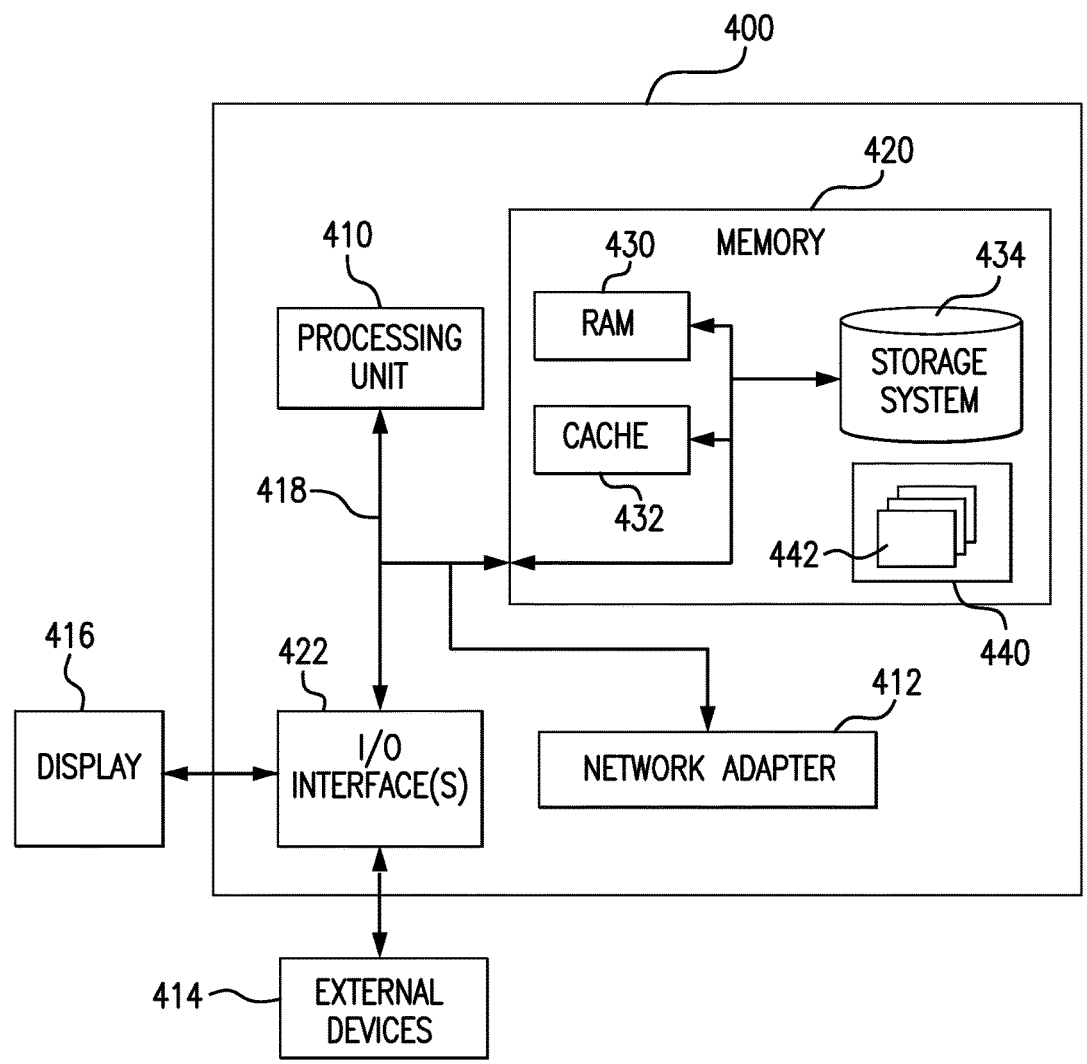
FIG. 6 is schematic diagram of a system for determining a rotary blade adjustment, showing system modules.

With reference to FIG. 6, a system 400 for determining a track and balance adjustment for a rotary blade is shown. System 400 is intended to represent any type of computer system capable of carrying out the teachings of various embodiments of the present invention. System 400 is only one example of a suitable system and is not intended to suggest any limitation as to the scope of use or functionality of embodiments of the invention described herein. Regardless, system 400 is capable of being implemented and/or performing any of the functionality set forth herein.

System 400 is a computing device operational with numerous other general purpose or special purpose computing system environments or configurations. Examples of well-known computing systems, environments, and/or configurations that may be suitable for use with system 200, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

System 400 may be described in the general context of computer system-executable instructions, such as program modules, being executed by a computer system. Generally, program modules may include routines, programs, objects, components, logic, data structures, and so on that perform particular tasks or implement particular abstract data types. System 400 may be practiced in distributed data processing environments where tasks are performed by remote processing devices that are linked through a communications network. In a distributed data processing environment, program modules may be located in both local and remote computer system storage media including memory storage devices.

As illustrated, system 400 is a general-purpose computing device that includes but is not limited to one or more processors 410, a system memory 420, and a bus 418 that couples various system components including system memory 420 to processor 410. System 400 further includes one or more non-transitory machine-readable media. Such media may be any available media that is accessible by system 400, and it includes both volatile and non-volatile media, removable and non-removable media. For example, as illustrated, system memory 420 includes computer system readable media in the form of random access memory (RAM) 230 and/or cache memory 432. System 400 further includes other removable/non-removable, volatile/non-volatile computer system storage media. By way of example only, storage system 434 is provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, system memory 420 may include at least one program product having a set (e.g., at least one) of program modules that are configured to carry out the functions of embodiments of method 100 (shown in FIG. 2).

Program/utility 440, having a set (at least one) of program modules 442 may be stored in system memory 420 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

System 400 may also communicate with one or more external devices 414 such as a keyboard, a pointing device, a display 416, etc.; one or more devices that enable a user to interact with system 400 and/or any devices (e.g., network card, modem, etc.) that enable system 400 to communicate with one or more other computing devices. Such communication can occur via Input/Output (I/O) interfaces 430. Still yet, system 400 can communicate with one or more networks such as a local area network (LAN), a general wide area network (WAN), and/or a public network (e.g., the Internet) via network adapter 412.

Aircraft maintainers generally prefer to have options peculiar to their specific requirements and preferences. For example, a maintainer may desire that a track and balance event for a given aircraft exclude a certain task for a specific blade. Alternatively, the maintainer may desire the track and balance event achieve a predetermined goal (e.g. within 5% of an optimum vibration level) with a minimum number of adjustments. Conventional systems and methods that comprehensively analyze a set of potential adjustment combinations can have difficulty developing track and balance solutions that meet such requirements. Embodiments of the systems and methods for developing track and balance solutions can provide an improved user experience by rapidly developing track and balance solutions by reducing analysis activity devoted to combinations likely to not meet maintainer needs.

Embodiments of the systems and methods described herein employ a mixed integer nonlinear programming formulation to generate recommended adjustments. Integer decision variables are introduced to count the number of adjustments that a given blade or blade set requires. Continuous decision variables are used for specific adjustment values for particular adjustments on a given blade. A branch and bound analysis method is implemented to intelligently enumerate and evaluate different combinations of adjustment subsets. At each search tree node, a constrained optimization problem for the continuous decision variables is solved to determine specific adjustment values. Additional problem-specific heuristics are included to the efficiency of the tree search. This can reduce the time required to find an adjustment plan that satisfies requirements received from a user.

The methods and systems of the present disclosure, as described above and shown in the drawings, provide improved systems and methods for adjusting rotary blade track and balance with superior properties including intelligent enumeration and evaluation of different combinations and adjustment subsets. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A method of adjusting track and balance of a rotary blade, comprising:
receiving performance data for a rotary blade;
establishing at least one threshold for the rotary blade;
defining an adjustment solution search tree;
selecting a first adjustment solution from the search tree for evaluation;
evaluating the first adjustment solution using the threshold;
determining whether to evaluate a second adjustment solution from the search tree based on the evaluation of the first adjustment solution;
determining a number of adjustments for the selected first adjustment solution;
comparing the number of adjustments for the selected first adjustment solution with the threshold for the rotary blade;
pruning the first adjustment solution based on the determined number of adjustments and threshold comparison;
selecting a second adjustment solution from the search tree for evaluation; and
adjusting track and balance of the rotary blade according to one of the first adjustment solution and the second adjustment solution.

2. A method as recited in claim 1, wherein the threshold includes a number of adjustments associated with an adjustment solution for the rotary blade.

3. A method as recited in claim 1, wherein the threshold includes an expected performance associated with an adjustment solution for the rotary blade.

4. A method as recited in claim 1, further including receiving mode selection input.

5. A method as recited in claim 4, wherein the mode selection is selected from a group including meets limits and best ride.

6. A method as recited in claim 1, wherein defining the adjustment solution search tree includes defining a root node.

7. A method as recited in claim 6, wherein defining the adjustment search tree includes defining a leaf level with adjustment on and off nodes branched to the root node.

8. A method as recited in claim 7, wherein defining the adjustment search tree includes defining at least one intervening level having adjustment on and off nodes branched between the leaf nodes and the root node.

9. A method as recited in claim 8, wherein at least one of the intervening nodes includes a continuous variable for an adjustment value and integer values for an adjustment decision.

10. A method of adjusting track and balance of a rotary blade, comprising:
   receiving performance data for a rotary blade;
   establishing at least one threshold for the rotary blade;
   defining an adjustment solution search tree;
   selecting a first adjustment solution from the search tree for evaluation;
   evaluating the first adjustment solution using the threshold;
   determining whether to evaluate a second adjustment solution from the search tree based on the evaluation of the first adjustment solution;
   calculating an expected performance for the first adjustment solution;
   comparing the expected performance to one of a performance constraint and a performance threshold;
   pruning the first adjustment solution in the event that the calculated expected performance is worse than the performance constraint;
   updating the adjustment threshold in the event that the calculated expected performance is better than the performance constraint; and
   adjusting track and balance of the rotary blade according to one of the first adjustment solution and the second adjustment solution.

11. A method as recited in claim 10, further including pruning the first adjustment solution in the event that the calculated expected performance is worse than the performance threshold, and updating the adjustment threshold and/or the performance threshold in the event that the calculated adjustment number and/or expected performance is better than the adjustment threshold and/or the performance threshold.

12. A system for adjusting track and balance of a rotary blade, comprising:
   a memory; and
   a processor disposed in communication with the memory, wherein the memory has instructions recorded thereon that, when read by the processor cause the processor to:
   receive performance data for a rotary blade;
   establish at least one threshold for the rotary blade;
   define an adjustment solution search tree;
   select a first adjustment solution from the search tree for evaluation;
   evaluate the first adjustment solution using the threshold;
   determine whether to evaluate a second adjustment solution from the search tree based on the evaluation of the first adjustment solution;
   determine a number of adjustments for the selected first adjustment solution;
   compare the number of adjustments for the selected first adjustment solution with the threshold for the rotary blade;
   prune the first adjustment solution based on the determined number of adjustments and threshold comparison;
   select a second adjustment solution from the search tree for evaluation; and
   adjust track and balance of the rotary blade according one of the first adjustment solution and the second adjustment solution.

13. A system for adjusting track and balance of a rotary blade, comprising:
   a memory; and
   a processor disposed in communication with the memory, wherein the memory has instructions recorded thereon that, when read by the processor cause the processor to:
   receive performance data for a rotary blade;
   establish at least one threshold for the rotary blade;
   define an adjustment solution search tree;
   select a first adjustment solution from the search tree for evaluation;
   evaluate the first adjustment solution using the threshold;
   determine whether to evaluate a second adjustment solution from the search tree based on the evaluation of the first adjustment solution;
   calculate an expected performance for the first adjustment solution;
   compare the expected performance to one of a performance constraint and a performance threshold;
   prune the first adjustment solution in the event that the calculated expected performance is worse than the performance constraint;
   update the adjustment threshold in the event that the calculated expected performance is better than performance constraint; and
   adjust track and balance of the rotary blade according to one of the first adjustment solution and the second adjustment solution.

* * * * *